Figure 1:
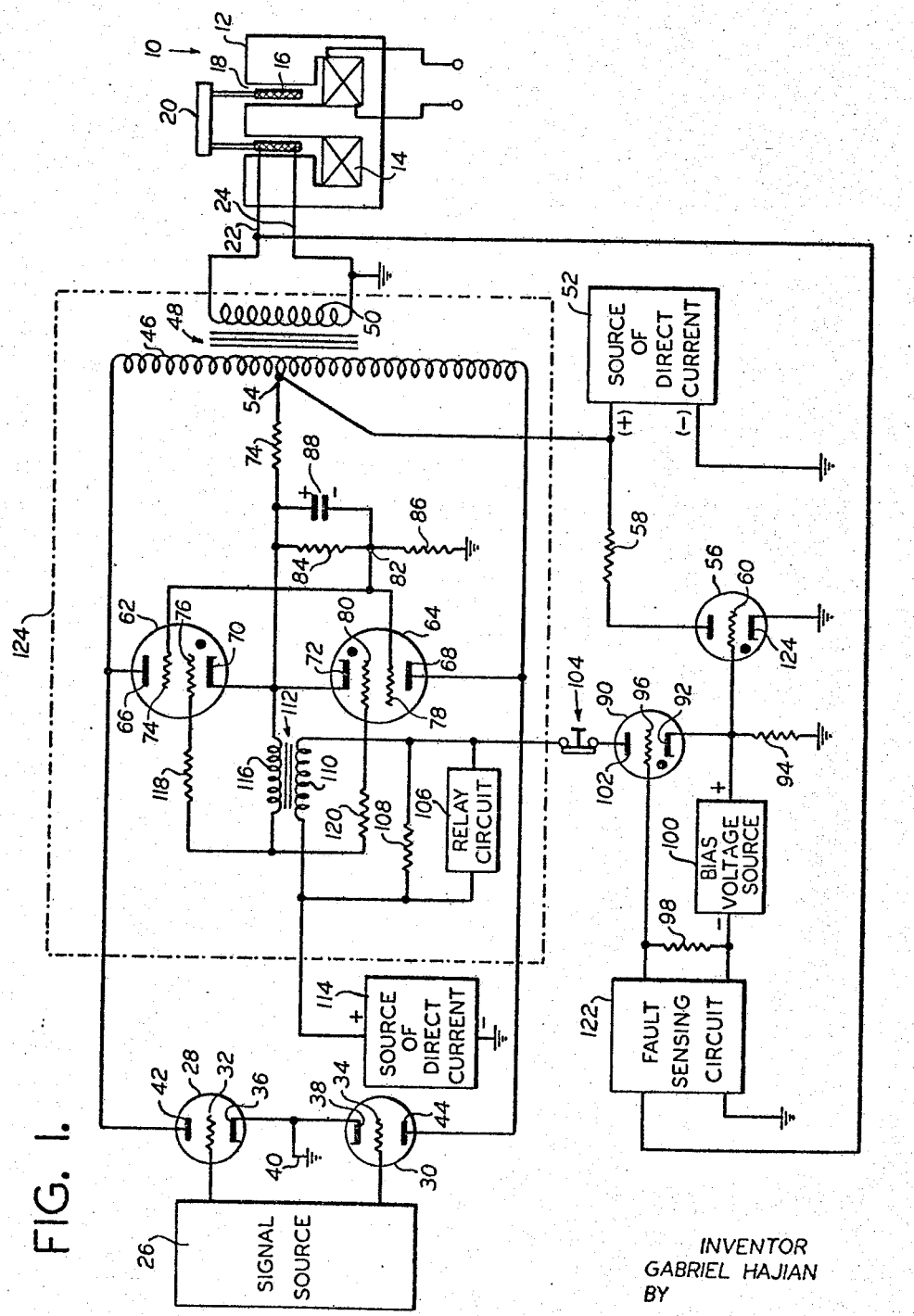

Oct. 2, 1962 G. HAJIAN 3,056,910
VIBRATION EXCITER AMPLITUDE PROTECTOR
Filed Dec. 30, 1958 2 Sheets-Sheet 2

INVENTOR
GABRIEL HAJIAN
BY
*Byerly, Townsend, Watson & Churchill*
ATTORNEYS

United States Patent Office 3,056,910
Patented Oct. 2, 1962

3,056,910
VIBRATION EXCITER AMPLITUDE PROTECTOR
Gabriel Hajian, East Haven, Conn., assignor, by mesne assignments, to Textron Electronics, Inc., a corporation of Delaware
Filed Dec. 30, 1958, Ser. No. 783,774
16 Claims. (Cl. 318—128)

The present invention relates to vibration exciter systems and more particularly to protective circuitry for preventing damage to an exciter due to faulty excitation.

A basic system for vibration testing includes an electrodynamic vibration exciter, a power amplifier for supplying exciting voltage to the driving coil of the exciter, and a source of test signals which are fed to the power amplifier. Various safety devices may be provided for operation between or in conjunction with each of the system components. However, as an additional safety feature it is desirable to include some means responsive to the energizing voltage actually supplied to the driving coil for interrupting this voltage and stopping the exciter if the voltage should assume dangerous proportions. Apparatus for sensing the damaging propensities of the voltage applied to the driving coil forms the basis of another application assigned to the same assignee as the present application and will not be discussed here beyond that necessary to understand the present invention which is directed to means for arresting the motion of the exciter when a fault is detected.

More specifically, when signals applied to the driving coil of the exciter by an electronic power amplifier become excessive, or if a fault occurs in the amplifier, damage to the moving element of the exciter is likely if the moving element is allowed to strike the mechanical stops. Merely interrupting the energizing voltage for the exciter is not sufficient since the fault signal during the brief interval of detection may impart sufficient acceleration to the exciter to carry it against the stops due to its own momentum. It is therefore necessary to include some form of braking means. On the other hand, in spite of the inclusion of braking means it is still necessary to interrupt the energizing voltage for the exciter to insure against driving of the braking means by a low impedance source.

Therefore, in accordance with the present invention, there is provided a motion arresting circuit for a vibration exciter system in which the driving coil of the exciter is coupled effectively in series with the output stage of a power amplifier and its source of energizing voltage including: first normally open switch means coupled to the source of voltage for providing a shunt therefor when closed, second normally open switch means coupled to the driving coil for providing a shunt therefore when closed, and means responsive to a fault in the system for substantially simultaneously closing the first and second switch means whereby the energizing voltage for the output stage is reduced to a low value and the exciter is simultaneously subjected to dynamic braking.

Figure 2:
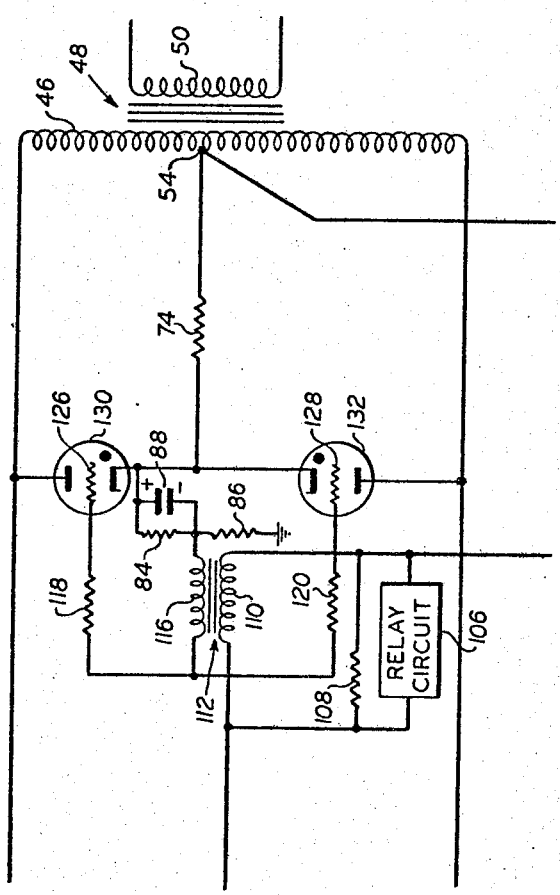

A better understanding of the invention will be had after reading the following detailed description of an exemplary embodiment of the invention with reference to the appended drawing in which:

FIGURE 1 represents a schematic circuit diagram of a motion arresting circuit embodying the present invention and applied to a vibration exciter system, and FIGURE 2 represent a schematic circuit diagram of a modification of FIGURE 1.

Referring to FIG. 1 of the drawing, the vibration exciter is designated generally by the reference numeral 10. The exciter includes a field structure or stator core 12 carrying a field winding 14 which is arranged to be connected to a source of direct current. A driving coil 16 is mounted for movement within the gap 18 provided in the core 12 and carries or is joined to the exciter table 20 for actuation thereof. Input leads 22 and 24 are provided for supplying excitation signals to the driving coil.

A signal source represented generally by the box 26 may include sinusoidal and random noise generators, amplifiers, protective circuits, equalizers, and the like in known manner. The final or output stage of the power amplifier is represented, however, by the amplifier tubes 28 and 30 which are shown connected in push-pull with their control electrodes 32 and 34 coupled to the source 26, their cathode electrodes 36 and 38 coupled to a point of reference potential (ground) at 40, and their anode or plate electrodes 42 and 44 coupled to opposite ends of the primary winding 46 of an output transformer 48. The secondary winding 50 of the transformer 48 is shown connected to the input leads 22 and 24 of the driving coil 16 with the lead 24 connected to ground. A direct current power supply 52 has its negative terminal connected to ground and its positive terminal connected to a center-tap 54 on the winding 46. Thus, each half of the winding 46 is connected in series with its respective tube 28 or 30 and the source of energizing voltage therefor, 52. In this manner the driving coil 16 of the exciter is coupled effectively in series with the output stage of the power amplifier and its source of energizing voltage. The structure described up to this point constitutes a basic vibration exciter system.

In electronic equipment regardless of the painstaking care in design and construction there is always present the danger of short-circuits or other faults developing. It is not unknown, for example, for an amplifier tube such as tube 28 or 30 to develop a short between its electrodes. This would cause a sudden surge of current to be impressed upon the exciter with obvious results. In order to protect against this and similar contingencies there is provided a first normally open switch in the form of a gaseous discharge device or tube 56 which has its anode-cathode path connected in series with a small current limiting resistor 58 across the output of the power supply 52. When the control electrode 60 of the tube 56 is driven in a positive direction to trigger the tube and close the "switch," the low resistance shunt developed across the supply 52 will cause its output voltage to drop to some low value. It is assumed that the internal impedance of the supply 52 and any filter forming a part thereof is large compared with the series impedance of resistor 58 and tube 56 when the latter is conducting. Upon attenuation of the voltage furnished by power supply 52, it will be appreciated that there will ensue a comparable attenuation of the signals fed through transformer 48 to the exciter driving coil 16.

In order to ensure prompt arresting of the motion of the exciter there is also provided a second normally open switch in the form of a pair of gaseous discharge devices or tubes 62 and 64 which are coupled in a manner to be described to the driving coil 16 for providing a shunt therefor when closed or conducting. As shown, the tube 62 has an anode electrode 66 connected in parallel with anode 42 of tube 28 to one end of winding 46. In similar manner tube 64 has an anode electrode 68 connected to the other end of winding 46. Cathode electrodes 70 and 72 of tubes 62 and 64, respectively, are joined together and connected through a small current limiting resistor 74 to the center-tap 54 of winding 46. In this manner the anode-cathode paths of tubes 62 and 64 are connected in shunt with the respective halves of the transformer winding 46, and thus effectively in shunt with the driving coil of the exciter.

Each of the tubes 62 and 64 is provided with a screen electrode 74 and 78, and a control electrode, 76 and 80, respectively. The screen electrodes 74 and 78 are joined together and connected to the point 82 on the biasing network consisting of resistors 84 and 86 and shunt capacitor 88. As seen in the drawing the parallel arrangement of resistor 84 and capacitor 88 is connected in series with resistor 86 between the cathodes 70, 72 and ground.

The means or apparatus for substantially simultaneously triggering or conditioning tubes 56, 62 and 64 will now be described. For this purpose there is provided another grid controlled gaseous discharge device or tube 90. The cathode electrode 92 of tube 90 is connected both through a resistor 94 to ground and to the control electrode 60 of tube 56, the resistor 94 constituting an output impedance for tube 90. A control grid or electrode 96 is connected through a resistor 98 to the negative terminal of a bias voltage source 100. The positive terminal of the source 100 is connected to the cathode 92 for maintaining tube 90 normally non-conducting and establishing a triggering level. The anode electrode 102 of tube 90 is connected through a reset switch 104 and the parallel network consisting of relay circuit 106, resistor 108 and primary winding 110 of pulse transformer 112 to the positive terminal of a source of direct current 114. Pulse transformer 112 is provided with a secondary winding 116 connected between the cathodes 70 and 72 and the current limiting resistors 118 and 120 to the control electrodes 76 and 90 of tubes 62 and 64, respectively. The relay circuit 106 may consist of a network of electro-mechanical relays arranged when energized to disable some or all of the amplifier stages supplying the exciter. Among other things, the relay circuit 106 can be arranged to open the circuit between source 52 and both resistor 58 and tap point 54 whereby the anode-cathode discharge in tube 56 is extinguished readying it for future operation.

For the purpose of triggering tube 90 there is coupled across resistor 98 a fault sensing circuit 122. The input of the sensing circuit is connected across the secondary winding 50 of transformer 48, as shown. As described in the aforementioned copending application, the fault sensing circuit detects an over-voltage and converts it into a pulse signal for triggering tube 90. When tube 90 is fired a large voltage will be developed initially across resistor 94, the latter having a high resistance as compared to the impedance of the network in the anode circuit of tube 90. The voltage across resistor 94 is caused to be large enough to fire tube 56 and cause it to attenuate the source of direct current for the power amplifier. It will be understood that resistor 108 provides a relatively low impedance shunt for the initial high inductive reactance of both the pulse transformer 112 and the relay circuit 106. This ensures rapid triggering of tube 56.

As soon as tube 56 fires, a low resistance discharge path will develop between its control electrode 60 and its cathode 124, which path effectively by-passes the resistor 94. Now, a surge of current is enabled to pass through tube 90 developing a high voltage pulse across resistor 108 in its anode circuit, and therefore across the winding 110 of the pulse transformer. The latter is designed in known manner to stretch the pulse applied to its input and applies a prolonged pulse to the control electrodes 76 and 80 of tubes 62 and 64. This prolonged pulse acts as a conditioning pulse to condition tubes 62 and 64 to fire or conduct whenever their anodes are driven positive with respect to their cathodes. It should be understood that the firing of tubes 90 and 56 and the conditioning of tubes 62 and 64 occurs in a matter of microseconds after a fault is detected.

As previously mentioned, the conduction of tube 56 immediately attenuates the signals fed to the driving coil of the exciter. However, the moving element of the exciter has appreciable mass and will continue to travel under its own momentum. In known manner, however, the movement of the driving coil in the field gap 18 induces in the coil 16 a back E.M.F. This back E.M.F. is fed back through the transformer 48 and appears across the tubes 62 and 64 which are now conditioned to conduct. Upon conduction (62 or 64 depending upon the instantaneous polarity of the back voltage) a short-circuit or shunt load will be placed upon the driving coil. This load serves to develop a dynamic braking force for the exciter and abruptly arrests its movement. In the meantime, the relay circuit 106 has begun to pick up and will ultimately shut down the major components of the system. Although the anode-cathode discharge of tube 56 is extinguished, as previously described, the grid-cathode discharge will continue causing the relay circuit to remain energized. Naturally, the source 114 is arranged to be independent of the disabling action of the relay circuit. When the fault is rectified, reset switch 104 may be actuated to extinguish both the tube 90 and the grid-cathode discharge of tube 56. This also resets the relay circuit 106.

By the use of discharge tubes with screen electrodes for tubes 62 and 64 it is possible to use a high impedance pulse transformer, 112. However, the resistors 118 and 120 are required with the high impedance transformer in order that conduction of one tube will not attenuate the control grid voltage applied to the other tube.

In the arrangement of FIG. 1, the screen electrodes 74 and 78 are arranged in a unique circuit to ensure continued firing of tubes 62 and 64 so long as at least one of the tubes is triggered by a signal from the transformer 112. This will be better understood when it is realized that as soon as either tube 62 or 64 fires, the discharge path between the anode and screen electrode will discharge biasing capacitor 88. Source 52 has already been attenuated by conduction of tube 56 and, therefore, capacitor 88 will remain discharged. Now, with the negative hold-off bias removed from tubes 62 and 64, a positive signal is no longer needed on the control electrodes to initiate a discharge. This feature maintains conduction of tubes 62 and 64 as long as there is energy in the exciter to be dissipated even though the pulse on transformer 112 subsides. During normal operation of the exciter, capacitor 88 smooths the biasing voltage and prevents firing of tubes 62 and 64 if the voltage from supply 52 should briefly drop.

Solely by way of example it can be mentioned that it is preferred to employ a hydrogen filled tube such as the type 5C22 for the tube 56. These tubes are extremely fast in firing and can handle high instantaneous currents of the order of 300 amperes or more. The hydrogen tube is characterized by a positive grid characteristic.

For tube 90, any good gas tube with adequate current handling capacity may be used. A tube with a negative grid characteristic has been illustrated in FIGURE 1.

Tubes 62 and 64 may be of the mercury vapor type such as type 105. The tubes should be capable of carrying an average current of about 1 ampere, with peak currents of 40 to 50 amps.

Instead of using the four element tubes as shown in FIG. 1, it is possible to replace them with three element discharge devices having a negative grid characteristic as shown in FIG. 2. That is, the circuit shown in FIG. 2 may be substituted for the portion shown within the dot-dash lines 124 in FIG. 1.

Referring now to FIG. 2, it will be seen that the biasing network of resistors 84 and 86 and capacitor 88 is used to bias negatively the control electrodes 126 and 128 of gaseous discharge devices 130 and 132. Since capacitor 88 can no longer be discharged by conduction of tubes 130 and 132, it is necessary to make the time constant of elements 84 and 88 sufficiently small that the hold-off bias will disappear before the termination of a pulse from transformer 112. In the absence of screen electrodes and the concomitant shielding, it is also necessary to lower the impedance of the transformer 112. In all other respects the circuit will be the same as and will operate in the same manner as the circuit of FIG. 1.

With respect to both embodiments it is desirable that the firing of tubes 62 and 64 or 130 and 132 occur at the same time as the firing of tube 56. For this reason the delay should be kept at a minimum. However, if simultaneous firing can not be obtained, it is preferred that tube 56 be arranged to fire first in order to avoid steady high load currents on tubes 62 and 64 or 130 and 132.

Having described the invention with reference to certain preferred embodiments thereof, it will be understood that the circuits are susceptible of modification without departing from the true spirit of the invention as defined in the appended claims.

What is claimed is:

1. A motion arresting circuit for a vibration exciter system in which a driving coil of an exciter is coupled effectively in series with an output stage of a power amplifier and its source of energizing voltage comprising: a first normally open switch means coupled to said source of voltage for providing a shunt therefor when closed, a second normally open switch means coupled effectively in parallel with said driving coil for providing a shunt therefor when closed, and means responsive to a fault in the system coupled in parallel to said first and second switch means for substantially simultaneously closing said first and second switch means whereby the energizing voltage for said output stage is reduced to a low value and the exciter is simultaneously subjected to dynamic braking.

2. A motion arresting circuit for a vibration exciter system in which a driving coil of an exciter is coupled effectively in series with an output stage of a power amplifier and its source of energizing voltage comprising: a first normally non-conducting gaseous discharge device coupled to said source of voltage for providing a low resistance shunt therefor when conducting, a second normally non-conducting gaseous discharge device coupled effectively in parallel with said driving coil for providing a low resistance shunt therefor when conducting, and means responsive to a fault in the system coupled in parallel to said first and second discharge devices for applying a triggering voltage substantially simultaneously thereto whereby the energizing voltage for said output stage is reduced to a low value and the exciter is simultaneously subjected to dynamic braking.

3. A motion arresting circuit according to claim 2, wherein the means responsive to a fault comprises a third normally non-conducting gaseous discharge device having an output circuit coupled to an input circuit of each of said first and second discharge devices.

4. A motion arresting circuit according to claim 2, wherein the means responsive to a fault comprises a third normally non-conducting gaseous discharge device, a first output circuit for said third discharge device coupled to an input circuit of said first discharge device, and a second output circuit for said third discharge device including a pulse transformer with a secondary winding coupled to an input circuit of said second discharge device.

5. A motion arresting circuit according to claim 2, further comprising an electro-mechanical relay circuit for deenergizing the sources of exciting voltage for said driving coil, and wherein the means responsive to a fault comprises a third normally non-conducting gaseous discharge device having an output circuit coupled to an input circuit of each of said first and second discharge devices and to said relay circuit.

6. A motion arresting circuit for a vibration exciter system in which a driving coil of an exciter is coupled to the secondary winding of a transformer whose primary winding is coupled in series with an output stage of a power amplifier and its source of energizing voltage comprising: a first normally non-conducting gaseous discharge device coupled to said source of voltage for providing a low resistance shunt therefor when conducting; a second normally non-conducting gaseous discharge device coupled to the primary winding of said transformer for providing a low resistance shunt therefor when conducting; and a triggering circuit for said first and second discharge devices, said triggering circuit including a third normally non-conducting gaseous discharge device having at least a cathode and an anode, a source of energizing current for said third discharge device, a pulse transformer having primary and secondary windings, and an output impedance, said source of current and the primary winding of said pulse transformer being connected in series between said anode and a point of reference potential, said output impedance being connected between said cathode and said point of reference potential and being coupled to said first discharge device, and the secondary winding of said pulse transformer being coupled to said second discharge device whereby in response to a triggering signal said third discharge device becomes conducting simultaneously rendering said first discharge device conducting and conditioning said second discharge device for conduction thereby simultaneously to disable the power amplifier and apply dynamic braking to said exciter.

7. A motion arresting circuit according to claim 6, wherein said first discharge device includes a cathode connected to said point of reference potential and a control electrode connected to the cathode of said third discharge device, said output impedance being shunted by the control electrode-cathode discharge path of said first discharge device upon conduction thereof causing a high voltage pulse to be supplied to said pulse transformer.

8. A motion arresting circuit according to claim 6, further comprising an electro-mechanical relay circuit for deenergizing the sources of exciting voltage for said driving coil, the input of said relay circuit being coupled in parallel with the primary winding of said pulse transformer.

9. A motion arresting circuit for a vibration exciter system in which a driving coil of an exciter is coupled to the secondary winding of a transformer whose primary winding is coupled in series with an output stage of a power amplifier and its source of energizing voltage comprising: a first normally non-conducting gaseous discharge device connected in series with a current limiting impedance across the output of said source of voltage to provide a shunt circuit therefor when said discharge device is conducting, the total impedance of said shunt circuit when said discharge device is conducting being related to the internal impedance of said source of voltage such as to cause the output voltage thereof to drop to a low value; a second normally non-conducting gaseous discharge device coupled to the primary winding of said transformer for providing a low resistance shunt therefor when conducting; and means responsive to a fault in the system coupled in parallel to said first and second discharge devices for applying a triggering voltage substantially simultaneously thereto whereby the exciter is subjected to dynamic braking at the same time that the energizing voltage for said output stage is reduced to said low value.

10. A motion arresting circuit according to claim 9, wherein the means responsive to a fault comprises a third normally non-conducting gaseous discharge device having an output circuit coupled to an input circuit of each of said first and second discharge devices.

11. A motion arresting circuit according to claim 9, wherein the means responsive to a fault comprises a third normally non-conducting gaseous discharge device, a first output circuit for said third discharge device coupled to an input circuit of said first discharge device, and a second output circuit for said third discharge device including a pulse transformer with a secondary winding coupled to an input circuit of said second discharge device.

12. A motion arresting circuit according to claim 9, further comprising an electro-mechanical relay circuit for deenergizing the sources of exciting voltage for said driving coil, and wherein the means responsive to a fault comprises a third normally non-conducting gaseous discharge device having an output circuit coupled to an input circuit of each of said first and second discharge devices and to said relay circuit.

13. A motion arresting circuit according to claim 9, wherein the means responsive to a fault comprises a third normally non-conducting gaseous discharge device having at least a cathode and an anode, a source of energizing current for said third discharge device, a pulse transformer having primary and secondary windings, and an output impedance, said source of current and the primary winding of said pulse transformer being connected in series between said anode and a point of reference potential, said output impedance being connected between said cathode and said point of reference potential and being coupled to said first discharge device, and the secondary winding of said pulse transformer being coupled to said second discharge device.

14. A motion arresting circuit according to claim 13, wherein said first discharge device includes a cathode connected to said point of reference potential and a control electrode connected to the cathode of said third discharge device, said output impedance being shunted by the control electrode-cathode discharge path of said first discharge device upon conduction thereof causing a high voltage pulse to be supplied to said pulse transformer.

15. A motion arresting circuit according to claim 13, further comprising an electro-mechanical relay circuit for deenergizing the sources of exciting voltage for said driving coil, the input of said relay circuit being coupled in parallel with the primary winding of said pulse transformer.

16. A motion arresting circuit for a vibration exciter system in which a driving coil of an exciter is coupled effectively in series with an output stage of a power amplifier and its source of energizing voltage comprising: a first normally non-conducting gaseous discharge device coupled to said source of voltage for providing a low resistance shunt therefor when conducting, a second gaseous discharge device coupled effectively in parallel with said driving coil for providing a low resistance shunt therefor when conducting, means for biasing said second device so as to render it normally non-conducting, means responsive to a fault in the system coupled in parallel to said first and second discharge devices for applying a triggering voltage substantially simultaneously thereto, and means associated with said biasing means for removing said bias as soon as conduction is initiated in said second device, thereby to maintain said second device in condition to conduct after termination of said triggering voltage, whereby the energizing voltage for said output stage is reduced to a low value and the exciter is simultaneously subjected to dynamic braking.

References Cited in the file of this patent
UNITED STATES PATENTS 2,297,084     Swallow _____ Sept. 29, 1942